United States Patent
Han

(10) Patent No.: US 10,994,630 B2
(45) Date of Patent: May 4, 2021

(54) METHOD AND APPARATUS FOR CONTROLLING POWER CONSUMPTION OF VEHICLE AND VEHICLE

(71) Applicant: BOE Technology Group Co., Ltd., Beijing (CN)

(72) Inventor: Litong Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 394 days.

(21) Appl. No.: 16/014,881

(22) Filed: Jun. 21, 2018

(65) Prior Publication Data
US 2019/0061550 A1 Feb. 28, 2019

(30) Foreign Application Priority Data
Aug. 22, 2017 (CN) .......................... 201710726663.5

(51) Int. Cl.
| | |
|---|---|
| *B60L 53/65* | (2019.01) |
| *B60W 20/13* | (2016.01) |
| *H04W 52/02* | (2009.01) |
| *H04W 4/02* | (2018.01) |
| *H04W 4/029* | (2018.01) |

(52) U.S. Cl.
CPC .............. *B60L 53/65* (2019.02); *B60W 20/13* (2016.01); *H04W 4/026* (2013.01); *H04W 4/029* (2018.02); *H04W 52/0254* (2013.01); *H04W 4/027* (2013.01); *Y02D 30/70* (2020.08)

(58) Field of Classification Search
CPC ....... B60L 53/65; B60W 20/13; H04W 4/026; H04W 4/027; H04W 4/029; H04W 52/0254; Y02D 30/70
See application file for complete search history.

(56) References Cited

U.S. PATENT DOCUMENTS

| | | | |
|---|---|---|---|
| 8,116,719 B2 * | 2/2012 | Pelton ................... | H04W 4/027 455/403 |
| 9,596,562 B2 * | 3/2017 | Parameshwaran ...... | G01S 19/34 |

(Continued)

FOREIGN PATENT DOCUMENTS

| | | |
|---|---|---|
| CN | 106375396 A | 2/2017 |
| CN | 106441320 A | 2/2017 |

(Continued)

OTHER PUBLICATIONS

Office Action issued in related Chinese Patent Application No. 201710726663.5, dated May 21, 2019.
(Continued)

*Primary Examiner* — Abby Y Lin
*Assistant Examiner* — Dylan M Katz
(74) *Attorney, Agent, or Firm* — McDermott Will & Emery LLP

(57) ABSTRACT

The present disclosure proposes a method and apparatus for controlling power consumption of a vehicle, and a vehicle. The method comprises: determining state information of the vehicle according to driving data of the vehicle; and adjusting a power consumption mode of an energy consumption circuit in the vehicle according to the state information, wherein the energy consumption circuit consumes different amounts of energy in different power consumption modes.

6 Claims, 5 Drawing Sheets

(56) References Cited

U.S. PATENT DOCUMENTS

| | | | |
|---|---|---|---|
| 2011/0282620 A1* | 11/2011 | Sakuraoka | G01C 21/3423 702/141 |
| 2011/0300875 A1* | 12/2011 | Kim | G01S 19/47 455/456.1 |
| 2013/0245790 A1 | 9/2013 | Sakakihara | |
| 2013/0297166 A1* | 11/2013 | Thomas | B60T 13/08 701/70 |

FOREIGN PATENT DOCUMENTS

| | | |
|---|---|---|
| CN | 106546999 A | 3/2017 |
| CN | 107063247 A | 8/2017 |
| CN | 107067803 A | 8/2017 |

OTHER PUBLICATIONS

Office Action issued in corresponding Chinese Patent Application No. 201710726663.5, dated Jan. 15, 2020.

* cited by examiner

METHOD AND APPARATUS FOR CONTROLLING POWER CONSUMPTION OF VEHICLE AND VEHICLE

CROSS-REFERENCE TO RELATED APPLICATION(S)

This application claims priority to the Chinese Patent Application No. 201710726663.5, filed on Aug. 22, 2017, entitled "METHOD AND APPARATUS FOR CONTROLLING POWER CONSUMPTION OF SHARED VEHICLE AND SHARED VEHICLE", which is incorporated herein by reference in its entirety.

TECHNICAL FIELD

The present disclosure relates to the field of vehicles, and more particularly, to a method and apparatus for controlling power consumption of a vehicle and a vehicle.

BACKGROUND

With the continuous development of technology for shared vehicles, users' lives are becoming more and more convenient. For example, a user may transmit an unlocking instruction to a shared vehicle through an operation such as scanning a code using a mobile device etc., and then a positioning device on the shared vehicle transmits state information of the shared vehicle to the mobile device of the user and/or a cloud through a wireless communication network. After the user's riding is completed, locked state information of the shared vehicle is transmitted to the cloud, and after the cloud confirms the locked state, it confirms the end of using the vehicle to the mobile device.

However, in practical uses, a wireless communication component and a Global Positioning System (GPS) component in the shared vehicle need to transmit the state information of the shared vehicle to the cloud in real time. Thus, as the wireless communication component and the GPS component are in an operating state for a long time, it may lead to continuous power consumption in the shared vehicle.

SUMMARY

In an aspect, the embodiments of the present disclosure propose a method for controlling power consumption of a vehicle, the method comprising: determining state information of the vehicle according to driving data of the vehicle; and adjusting a power consumption mode of an energy consumption circuit in the vehicle according to the state information, wherein the energy consumption circuit consumes different amounts of energy in different power consumption modes.

In another aspect, the embodiments of the present disclosure propose an apparatus for controlling power consumption of a vehicle, the apparatus comprising: a controller; a memory having instructions stored thereon, which when executed by the controller, cause the controller to: determine state information of the vehicle according to driving data of the vehicle; and adjust a power consumption mode of an energy consumption circuit in the vehicle according to the state information, wherein the energy consumption circuit consumes different amounts of energy in different power consumption modes.

In yet another aspect, the embodiments of the present disclosure propose a vehicle, comprising: a controller, a motion sensor, and an energy consumption circuit, wherein the controller is configured to receive driving data of the vehicle from the motion sensor, determine state information of the vehicle according to the driving data; and adjust a power consumption mode of the energy consumption circuit in the vehicle according to the state information, wherein the energy consumption circuit consumes different amounts of energy in different power consumption modes, wherein the motion sensor is configured to collect the driving data of the vehicle; and wherein the energy consumption circuit is configured to receive a control instruction for switching the power consumption mode from the controller, and switch a current power consumption mode according to the control instruction.

Additional aspects and advantages of the present disclosure will be set forth in part in the description which follows, and in part will be obvious from the description, or may be learned by practice of the present disclosure.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The above and/or additional aspects and advantages of the present disclosure will become apparent and easily understood from the following description of embodiments in conjunction with the accompanying drawings, in which.

DETAILED DESCRIPTION

Figure 1:
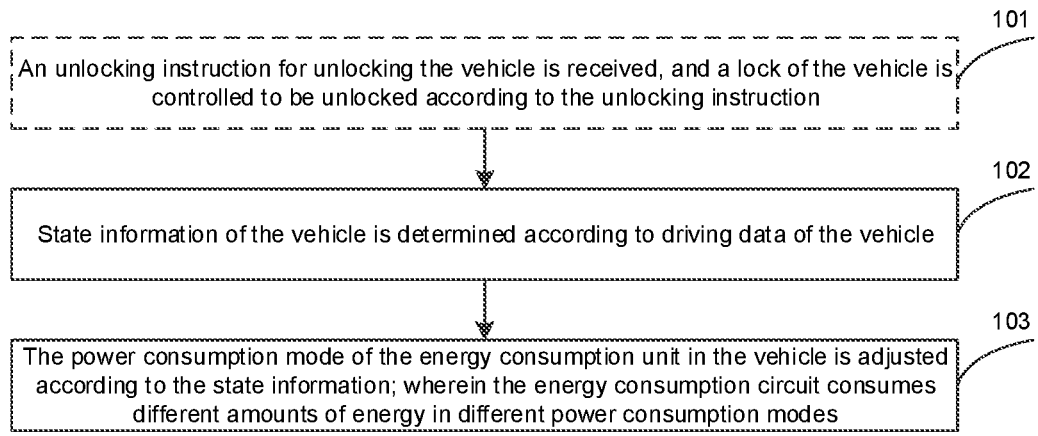
FIG. 1 is a schematic flowchart of a method for controlling power consumption of a shared vehicle according to an embodiment of the present disclosure.

Embodiments of the present disclosure are described in detail below. Examples of the embodiments are illustrated in the accompanying drawings, in which the same or similar reference numerals denote the same or similar elements or elements having the same or similar functions throughout. The embodiments described below with reference to the accompanying drawings are exemplary and are intended to explain the present disclosure, but should not be construed as limiting the present disclosure.

In the following embodiments, the term "shared vehicle" refers to a public transportation vehicle which may be used by many people and operated in a time-division rental mode. There are two kinds of storage modes of the vehicle, which are a docking station mode and a station-free mode. Common shared bicycles are stored in a station-free mode. In terms of a type of power, common shared vehicles comprise human-riding shared bicycles, for example, mobike, ofo, LimeBike, Spin etc., and electrical-riding shared motorcycles such as zebras, number 7, Jump Bike, HOPR Bike, etc. When the shared vehicle is a shared bicycle, its power source refers to human power of a riding user; and when the shared vehicle is a shared motorcycle, its power source refers to a battery mounted in the vehicle and a driving motor driven by the battery.

It should be noted that the embodiments of the present disclosure are not limited to shared vehicles, but can be applied to any vehicle which requires remote communication. For example, the following embodiments are also applicable to vehicles such as bicycles, electric bicycles, motorbikes, cars etc., which are purchased by a user himself/herself and are managed remotely via a public network. Therefore, any embodiment described with respect to a "shared vehicle" herein is also applicable to any vehicle having an energy consumption circuit (for example, a communication module, a Global Positioning System (GPS) module, etc.)

In the following embodiments, "similar" refers to that two parties which are compared are approximate to each other, for example, a difference therebetween is not more than 40%, a difference therebetween is not more than 20%, a difference therebetween is not more than 10%, etc. In some embodiments, the difference is not more than 20% for the accuracy of the judgment.

A method and apparatus for controlling power consumption of a vehicle and a vehicle according to an embodiment of the present disclosure will be described below with reference to the accompanying drawings.

FIG. 1 is a schematic flowchart of a method for controlling power consumption of a vehicle according to an embodiment of the present disclosure.

As shown in FIG. 1, the method for controlling power consumption of a vehicle comprises the following steps.

In an optional step 101, an unlocking instruction for unlocking the vehicle is received, and a lock of the vehicle is controlled to be unlocked according to the unlocking instruction.

This step 101 may be omitted in some embodiments. For example, when the lock of the vehicle is not mounted by a user himself/herself, for example, and may be unlocked, the method according to the present embodiment needs not to be responsible for unlocking the vehicle. In addition, in some other embodiments, even if the vehicle itself is not ridden, it may still be displaced (for example, when an operator of shared vehicles handles the shared vehicles in their entirety.) In this case, it may still need frequent communication with the cloud, so that the following scheme may still be used to determine a state of the vehicle and adjust a power consumption mode thereof correspondingly.

In the embodiment of the present disclosure, the unlocking instruction is triggered by the user. For example, the user may trigger the unlocking instruction through operations such as scanning a QR code located at the vehicle, NFC-based pairing, Bluetooth-based pairing, etc. Then, the unlocking instruction for unlocking the shared vehicle which is triggered by the user may be received by a controller in the shared vehicle, and the lock of the vehicle is unlocked according to the unlocking instruction so that the shared vehicle is in an available state.

In step 102, state information of the vehicle is determined according to driving data of the vehicle.

In some embodiments, driving data relating to motion of the vehicle may be received from an apparatus such as a motion sensor mounted on the vehicle etc. The driving data may comprise a driving speed, a driving acceleration, etc. of the shared vehicle. The state information is used to indicate a state in which the shared vehicle is currently is. The shared vehicle may be, for example, switched from a stopped state to a started state, or in a riding state, or switched from the riding state to the stopped state etc.

For example, the driving data of the shared vehicle may be collected through a relevant sensor. For example, the acceleration of the shared vehicle may be collected through an acceleration sensor (for example, a 6-axis acceleration sensor, a 3-axis acceleration sensor etc.), or the wheel speed during the motion of the shared vehicle may be collected through an angular speed sensor, or the displacement speed during the motion of the shared vehicle may be collected through a linear speed sensor. In the embodiments of the present disclosure, the specific implementations of the collection of the driving data are not limited thereto.

After the relevant sensor acquires the driving data of the shared vehicle, the controller in the shared vehicle may acquire the driving data of the shared vehicle from the relevant sensor on the shared vehicle, and determine the state information of the shared vehicle according to the driving data.

For example, a state recognition unit may be provided in the controller. The state recognition unit may collect driving data acquired by the relevant sensor uniformly at a short interval, and then determine the state information of the shared vehicle by analyzing the driving data.

For example, when an angular speed sensor is used to collect the speed during the motion of the shared vehicle, the state recognition unit may collect the speed sensed by the angular speed sensor uniformly at a short interval, and then recognize the state information of the shared vehicle by analyzing the speed.

Optionally, an acceleration sensor may be used to collect acceleration data in real time, integrate the acceleration over time based on the clock signal, and calculate the speed of the shared vehicle according to the collected acceleration data.

For example, when the speed of the shared vehicle gradually increases from 0, it indicates that the shared vehicle is in an acceleration phase. At this time, the state recognition unit may recognize that the shared vehicle is switched from a stopped state to a started state. When the speed of the shared vehicle maintains within a preset speed range, it indicates that the shared vehicle is in a riding phase. At this time, the state recognition unit may recognize that the shared vehicle is in a riding state. When the speed of the shared vehicle gradually decreases to 0, it indicates that the shared vehicle is in a deceleration phase. At this time, the state recognition unit may recognize that the shared vehicle is switched from the riding state to the stopped state.

In step 103, the power consumption mode of the energy consumption circuit in the shared vehicle is adjusted according to the state information; wherein the energy consumption circuit consumes different amounts of energy in different power consumption modes.

It can be understood that the cloud or the server may learn positions of the shared vehicle at the start of riding and the end of riding, i.e., managing the shared vehicle. When the speed of the shared vehicle gradually increases from 0, it indicates that the user starts riding the shared vehicle. At this time, the energy consumption circuit may transmit the state information of the shared vehicle to the cloud or the server, so that the cloud or the server learns a specific position of the shared vehicle, so as to manage the shared vehicle. Therefore, when the shared vehicle is switched from a stopped state to a started state, the energy consumption circuit in the shared vehicle may be controlled to switch from an energy-saving power consumption mode to a full power consumption mode to exchange information with the server or the cloud.

In the embodiments of the present disclosure, the energy-saving power consumption mode may be a power consumption mode which is lower in energy consumption than the full power consumption mode. For example, in an energy-saving power consumption mode, a GPS receiver may sleep briefly or operate in a low-power operation mode to save power, while in a full power consumption mode, the GPS receiver may always stay awake or operate in a high-power operation mode and continuously operate to continuously acquire position information. Similarly, in an energy-saving power consumption mode, a data communication module (for example, a 3G module, a GPRS module, a Bluetooth module, etc.) of the shared vehicle may sleep briefly or operate intermittently to save power, while in a full power consumption mode, the data communication module may always stay awake and continuously operate to continuously communicate with the cloud, so that the cloud may grasp relevant state information of the shared vehicle in real time.

When the speed of the shared vehicle maintains within a preset speed range, as the shared vehicle is in a riding phase at this time, the energy consumption circuit needs not to transmit the state information of the vehicle to the cloud or the server in real time. At this time, the energy consumption circuit in the shared vehicle may be controlled to switch from the full power consumption mode to the energy-saving power consumption mode.

When the speed of the shared vehicle gradually decreases to 0, it indicates that the user arrives at the destination, and may stop using the shared vehicle, and the energy consumption circuit may transmit the state information of the shared vehicle at this time to the cloud or the server. Therefore, when the shared vehicle is switched from the riding state to the stopped state, the energy consumption circuit in the shared vehicle may be controlled to switch from the energy-saving power consumption mode to the full power consumption mode.

It should be illustrated that after the full power consumption mode is maintained for a preset duration, that is, after the energy consumption circuit exchanges information with the server or the cloud, the energy consumption circuit in the shared vehicle may be controlled to switch from the full power consumption mode to the energy-saving power consumption mode again, i.e., reducing the power consumption of the shared vehicle.

In the method for controlling power consumption of a shared vehicle according to the present embodiment of the present disclosure, driving data of the shared vehicle is collected, state information of the shared vehicle is acquired according to the driving data, and an energy consumption circuit in the shared vehicle is controlled to enable the energy consumption circuit in the shared vehicle to adjust the power consumption mode thereof according to different state information, thereby reducing the power consumption of the shared vehicle and increasing the service life of the battery under limited power.

Figure 2:
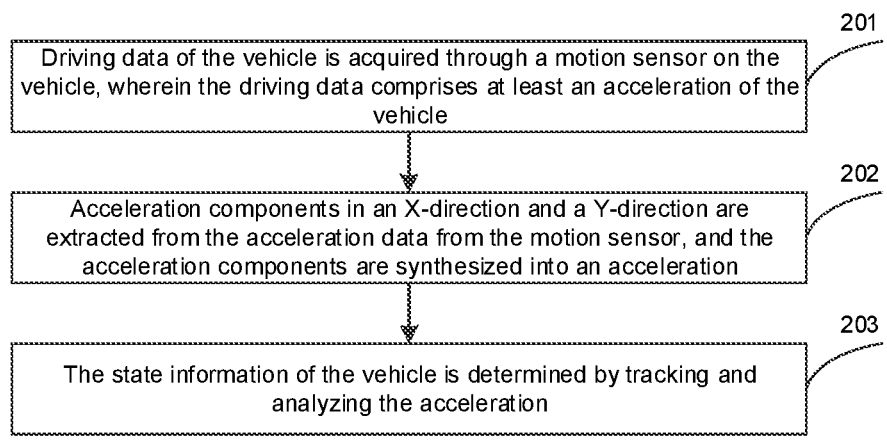
FIG. 2 is a schematic flowchart of another method for controlling power consumption of a shared vehicle according to an embodiment of the present disclosure.

In some embodiments of the present disclosure, as shown in FIG. 2, step 102 specifically comprises the following sub-steps.

In step 201, driving data of the shared vehicle is acquired through a motion sensor on the shared vehicle, wherein the driving data comprises at least an acceleration of the shared vehicle.

In the embodiment of the present disclosure, the motion sensor may be a 3-axis or 6-axis sensor. Optionally, in the present embodiment, the motion sensor is a 6-axis sensor, which may better judge a driving state of the shared vehicle.

The driving data of the shared vehicle is acquired through the motion sensor, which can improve the accuracy of acquisition of the driving data. In a specific implementation, as the motion sensor does not need an external signal, it may be packaged in a support pipe of an axle or a seat of the shared vehicle, which is easy to use by the user and can improve the safety of use.

In step 202, acceleration components in an X-direction and a Y-direction are extracted from the acceleration data from the motion sensor, and the acceleration components are synthesized into the acceleration.

It can be understood that, when the user is riding a shared vehicle, it is a very rare road condition in which the user continuously goes uphill or downhill for a long time. Therefore, an acceleration component in a Z-axis (for example, a vertical axis) direction may be eliminated from the above acceleration data, only acceleration components in the X-axis direction and the Y-axis direction (for example, two mutually orthogonal directions on a horizontal plane) may be extracted, and the acceleration components are synthesized into an acceleration to reduce the workload of the controller.

Specifically, the acceleration acquired by the motion sensor is marked as $\alpha$, an acceleration component of the acceleration in the X-axis direction is $\alpha_x$, and an acceleration component of the acceleration in the Y-axis direction is $\alpha_Y$. Then, a may be obtained as:

$$\alpha = \sqrt{\alpha_X^2 + \alpha_Y^2}; \quad (1)$$

In step 203, the state information of the shared vehicle is determined by tracking and analyzing the acceleration.

It can be understood that, as a user of a shared bicycle has limited physical power and a battery of a motorcycle has limited output power, no matter whether the shared vehicle is in an acceleration phase or a deceleration phase, it is substantially reflected as a measure of a number of times the user of the shared bicycle pedals within a preset time, or a measure of output power of the battery of the motorcycle within a preset time. That is, when the shared vehicle is in the acceleration phase, the user pedals frequently or the battery has high output power within the preset time; and when the shared vehicle is in the deceleration phase, the user pedals less frequently or the battery has low output power within the preset time. Therefore, in a case that the user is under normal physiological conditions and normal road conditions, or the battery is managed by an output circuit board thereof, when the shared vehicle is in a riding state, a variation curve of the acceleration is presented as follows:

there is the same stepping cycle or similar stepping cycles between variation trajectories of the acceleration within two adjacent cycling periods. This stepping cycle is strongly correlated with stamina generated by aerobic respiration of a human body or output current of a cell of a battery via a Battery Management System (BMS.)

Figure 4A:
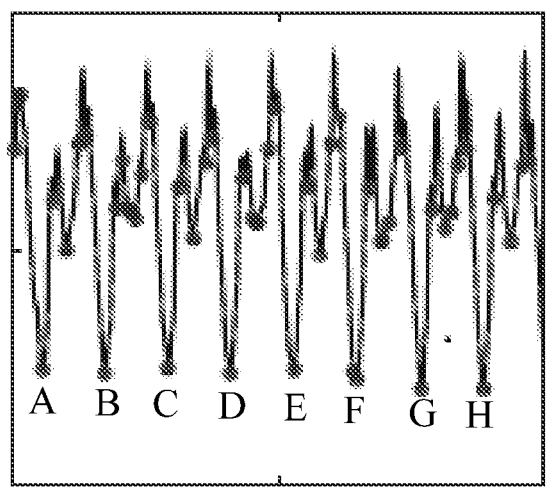
FIG. 4a is a diagram of a variation curve of an acceleration of a human-riding shared vehicle in a riding phase according to an embodiment of the present disclosure.

For example, as shown in FIG. 4a, illustrated is a schematic diagram of a variation curve of an acceleration of a human-riding shared vehicle in a riding phase according to an embodiment of the present disclosure. It can be seen from FIG. 4a that there is the same stepping cycle or similar stepping cycles between two adjacent peaks of the acceleration. For example, a peak of the acceleration at letter A and a peak of the acceleration at letter B have similar stepping cycles, or a peak of the acceleration at letter C and a peak of the acceleration at letter D have similar stepping cycles.

Therefore, when a value of the acceleration gradually increases from 0, that is, the shared vehicle is in an acceleration phase, it can be determined that the shared vehicle is switched from a stopped state to a started state; when the value of the acceleration gradually increases from a negative value to 0, that is, the shared vehicle is in a deceleration phase, it can be determined that the shared vehicle is switched from a riding state to the stopped state; and when there is the same stepping cycle or similar stepping cycles between variation of the acceleration in two adjacent riding periods, it indicates that the shared vehicle is in the riding state.

In the method of controlling power consumption of a shared vehicle according to the present embodiment, driving data of the shared vehicle is acquired through a motion sensor on the shared vehicle, wherein the driving data comprises at least an acceleration of the shared vehicle, acceleration components in an X direction and a Y direction are extracted from acceleration data collected in the motion sensor, the acceleration components are synthetized into an acceleration, and state information of the shared vehicle is determined by tracking and analyzing the acceleration. In this way, a state of the shared vehicle can be accurately recognized. In addition, the acceleration of the shared vehicle is acquired through the motion sensor, which can reduce the power consumption of the shared vehicle.

Figure 3:
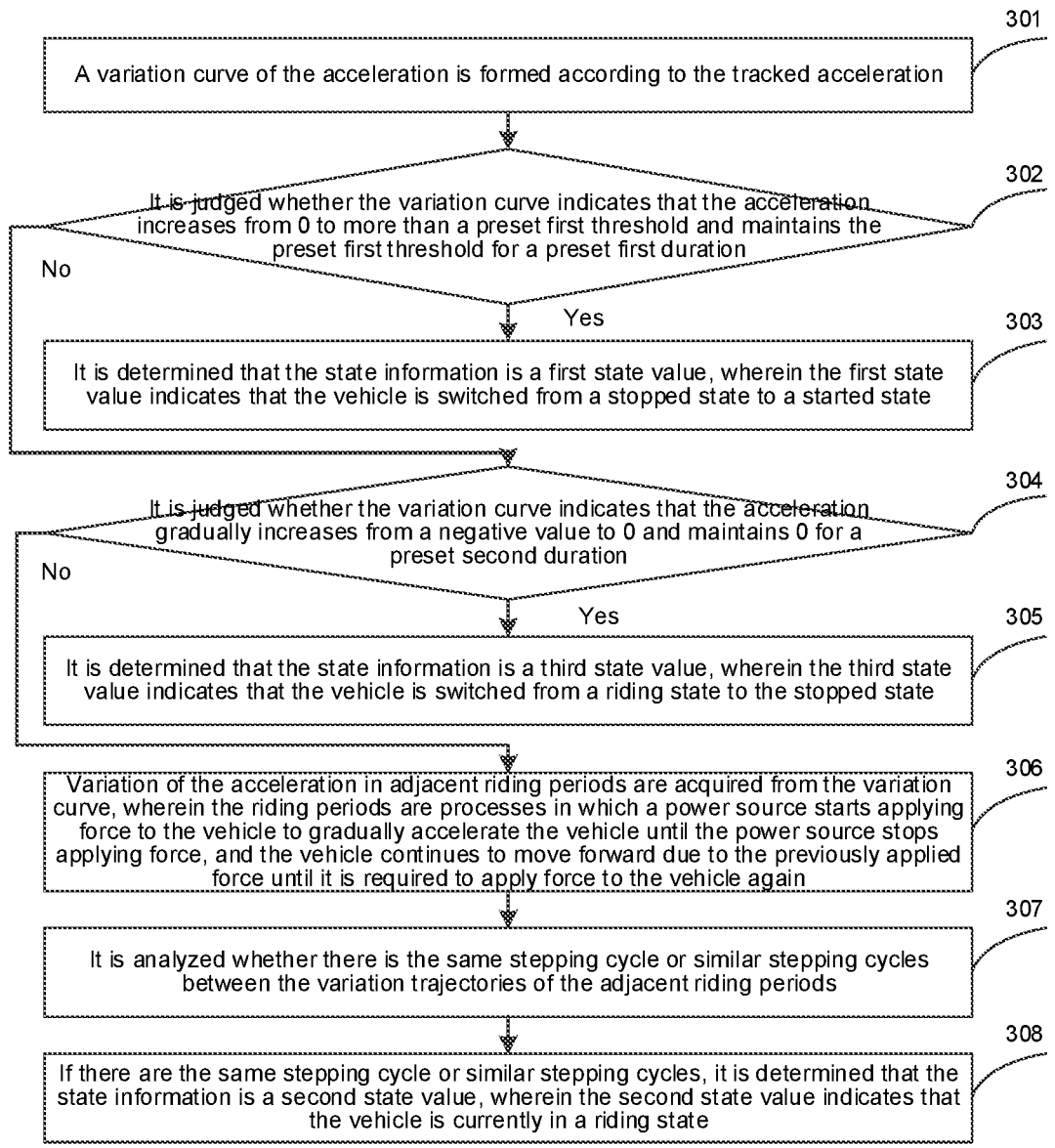
FIG. 3 is a schematic flowchart of yet another method for controlling power consumption of a shared vehicle according to an embodiment of the present disclosure.

In some embodiments of the present disclosure, as show in FIG. 3, step 203 specifically comprises the following sub-steps on the basis of the embodiment shown in FIG. 2.

In step 301, a variation curve of the tracked acceleration is formed according to the acceleration.

In step 302, it is judged whether the variation curve indicates that the acceleration increases from 0 to more than a preset first threshold and maintains the preset first threshold for a preset first duration, and if so, step 303 is performed; otherwise, step 304 is performed.

In the embodiment of the present disclosure, both of the preset first threshold and the preset first duration may be preset by a program which is built in the controller, or a desired threshold and duration may be selected to be input into the controller as the preset first threshold and the preset first duration.

When the shared vehicle is driving at a constant speed, the acceleration is 0. At this time, if the user of the shared bicycle applies increased force to step on the pedal, or the output power of the battery of the motorcycle increases, the acceleration also gradually increases from 0. Therefore, in the embodiment of the present disclosure, the process of judging whether the acceleration increases from 0 by selecting the first duration is to determine whether the shared vehicle is switched from a stopped state to a started state.

In step 303, it is determined that the state information is a first state value, wherein the first state value indicates that the shared vehicle is switched from a stopped state to a started state.

Optionally, when the variation curve indicates that the acceleration increases from 0 to more than a preset first threshold and maintains the preset first threshold for the preset first duration, it is determined that the state information is a first state value, wherein the first state value indicates that the shared vehicle is switched from a stopped state to a started state.

In step 304, it is judged whether the variation curve indicates that the acceleration gradually increases from a negative value to 0 and maintains 0 for a preset second duration, and if so, step 305 is performed; otherwise, step 306 is performed.

In the embodiment of the present disclosure, the preset second duration may be preset by a program which is built in the controller, or a desired threshold may be selected to be input into the controller as the preset second duration.

It can be understood that in a deceleration process, a value of the acceleration is negative. In the process that the shared vehicle is switched from driving in a deceleration state to driving at a constant speed, the acceleration also gradually increases from a negative value to 0. Therefore, in the embodiment of the present disclosure, the process of judging whether the acceleration gradually decreases by extending the second duration is to determine whether the shared vehicle is switched from a riding state to the stopped state.

In step 305, it is determined that the state information is a third state value, wherein the third state value indicates that the shared vehicle is switched from a riding state to the stopped state.

Optionally, when the variation curve indicates that the acceleration gradually increases from a negative value to 0 and maintains 0 for the preset second duration, it is determined that the state information is a third state value, wherein the third state value indicates that the shared vehicle is switched from a riding state to the stopped state.

In step 306, variation of acceleration in adjacent riding periods are acquired from the variation curve, wherein the riding periods are processes in which a power source starts applying force to the vehicle to gradually accelerate the vehicle until the power source stops applying force, and the vehicle continues to move forward due to the previously applied force until it is required to apply force to the vehicle again.

For example, as shown in FIG. 4a, a portion from a peak of the acceleration at letter A to a peak of the acceleration at letter B is a riding cycle, and a portion from a peak of the acceleration at letter B to a peak of the acceleration at letter C is also a riding cycle.

In step 307, it is analyzed whether there is the same stepping cycle or similar stepping cycles between the variation trajectories of the adjacent riding periods.

In step 308, if there is the same stepping cycle or similar stepping cycles, it is determined that the state information is a second state value, wherein the second state value indicates that the shared vehicle is currently in a riding state.

It can be known from FIG. 4a that a cycling period from A to B and a cycling period from B to C have the same stepping cycle or similar stepping cycles, the cycling period from B to C and a cycling period from C to D have the same stepping cycle or similar stepping cycles, . . . , and a cycling period from F to G and a cycling period from G to H have the same stepping cycle or similar stepping cycles. Therefore, it can be seen that FIG. 4a illustrates a variation curve of an acceleration of a shared vehicle in a riding phase.

However, it should be illustrated that an execution order of the above method steps is not limited to that in the embodiment shown in FIG. 3. In fact, in some other embodiments, steps S302 and S303 may be grouped as a group, steps S304 and S305 may be grouped as another group, and steps S306 to S308 may be grouped as yet another group. There is no fixed execution order relationship among the three groups of steps. In other words, it is not necessary to firstly judge whether the vehicle is in the first state and then judge whether the vehicle is in the second state, and instead, the three groups may be judged completely in parallel or in other orders.

In the method for controlling power consumption of a shared vehicle according to the present embodiment, when the variation curve of the acceleration indicates that the acceleration increases from 0 to more than a preset first threshold and maintains the preset first threshold for a preset first duration, it is determined that the state information is a first state value, wherein the first state value indicates that the shared vehicle is switched from a stopped state to a started state; when there is the same stepping cycle or similar stepping cycles between variation trajectories of adjacent riding periods, it is determined that the state information is a second state value, wherein the second state value indicates that the shared vehicle is currently in a riding state; and when the variation curve indicates that the acceleration gradually decreases to 0 and maintains 0 for a preset second duration, it is determined that the state information is a third state value, wherein the third state value indicates that the shared vehicle is switched from the riding state to the stopped state. In this way, the state of the shared vehicle can be accurately recognized.

Figure 5:
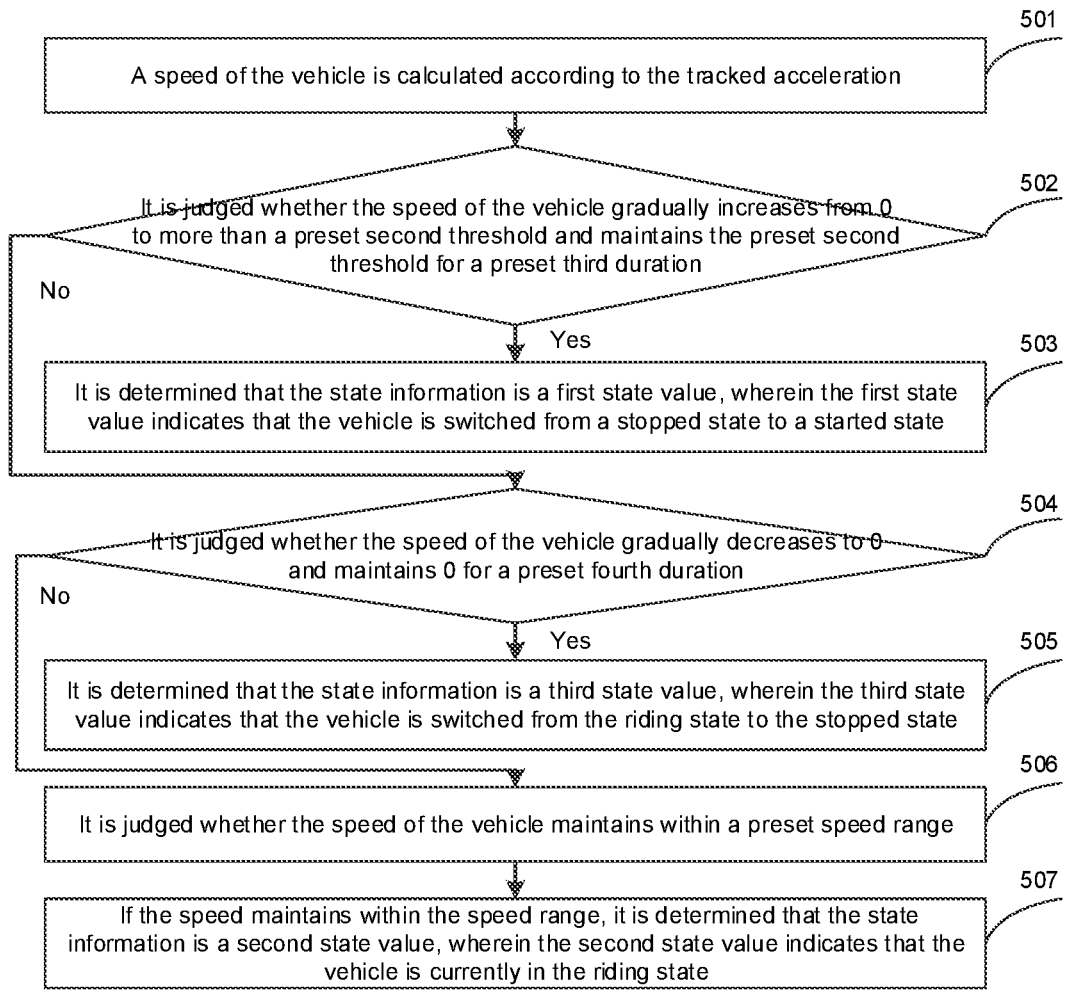
FIG. 5 is a schematic flowchart of still another method for controlling power consumption of a shared vehicle according to an embodiment of the present disclosure.

In some embodiments of the present disclosure, as shown in FIG. 5, step 203 specifically comprises the following sub-steps.

In step 501, a speed of the shared vehicle is calculated according to the tracked acceleration.

In the embodiments of the present disclosure, the acceleration is integrated over time, and the speed of the shared vehicle may be calculated according to the collected acceleration data.

In step 502, it is judged whether the speed of the shared vehicle gradually increases from 0 to more than a preset second threshold and maintains the preset second threshold for a preset third duration, and if so, step 503 is performed; otherwise, step 504 is performed.

In the embodiment of the present disclosure, both of the preset second threshold and the preset third duration may be preset by a program which is built in the controller, or a desired threshold and duration may be selected to be input into the controller as the preset second threshold and the preset third duration.

In step 503, it is determined that the state information is a first state value, wherein the first state value indicates that the shared vehicle is switched from a stopped state to a started state.

Figure 4B:
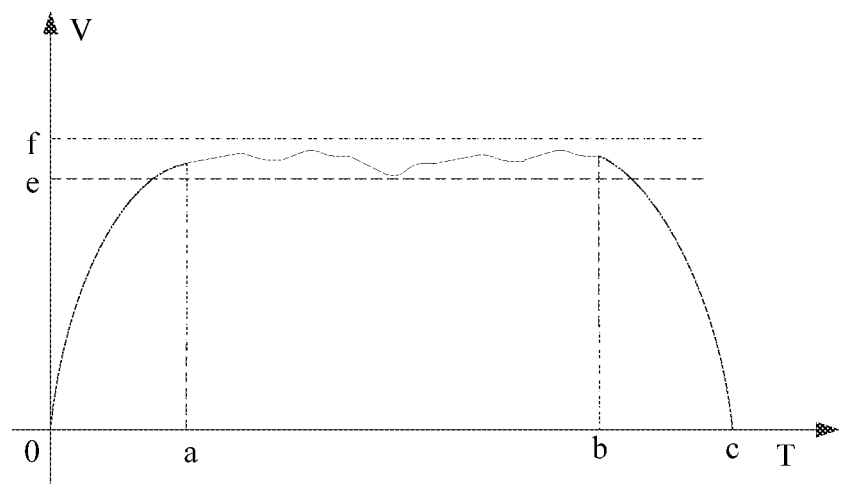
FIG. 4b is a diagram of a speed curve of a shared vehicle according to an embodiment of the present disclosure.

For example, as shown in FIG. 4b, illustrated is a schematic diagram of a speed curve of a shared vehicle according to an embodiment of the present disclosure. The second threshold is e, and the third duration is a. When the speed of the shared vehicle gradually increases from 0 to more than the preset second threshold and maintains the preset second threshold for a preset third duration, i.e., when the speed gradually increases from 0 to more than e and maintains e for the duration of a, it indicates that the shared vehicle is switched from a stopped state to a started state.

In step 504, it is judged whether the speed of the shared vehicle gradually decreases to 0 and maintains 0 for a preset fourth duration, and if so, step 505 is performed; otherwise, step 506 is performed.

In the embodiment of the present disclosure, the fourth duration may be preset by a program which is built in the controller, or a desired duration may be selected to be input into the controller as the preset fourth duration.

In step 505, it is determined that the state information is a third state value, wherein the third state value indicates that the shared vehicle is switched from the riding state to the stopped state.

For example, as shown in FIG. 4b, the fourth duration is c-b. When the speed of the shared vehicle gradually decreases to 0 and maintains 0 for the preset fourth duration, i.e., when the speed gradually decreases from a corresponding speed value at time b to 0 and maintains 0 for the duration of c-b, it indicates that the shared vehicle is switched from the riding state to the stopped state.

In step 506, it is judged whether the speed of the shared vehicle maintains within a preset speed range.

In the embodiment of the present disclosure, the preset speed range may be preset by a program which is built in the controller, or a desired speed range may be selected to be input into the controller as the preset speed range. For example, as shown in FIG. 4b, the preset speed range may be [e, f].

In step 507, if the speed maintains within the speed range, it is determined that the state information is a second state value, wherein the second state value indicates that the shared vehicle is currently in the riding state.

For example, as shown in FIG. 4b, when the speed maintains within [e, f] in a time interval [a, b], it may be determined that the shared vehicle is currently in the riding state.

The execution order of the above method steps is not limited to that in the embodiment shown in FIG. 5. In fact, in some other embodiments, steps S502 and S503 may be grouped as a group, steps S504 and S505 may be grouped as another group, and steps S506 and S507 may be grouped as yet another group. There is no fixed execution order relationship among the three groups of steps. In other words, it is not necessary to firstly judge whether the vehicle is in the first state and then judge whether the vehicle is in the second state, and instead, the three groups may be judged completely in parallel or in other orders.

In the method for controlling power consumption of a shared vehicle according to the present embodiment, when the speed of the shared vehicle gradually increases from 0 to more than a preset second threshold and maintains the preset second threshold for the preset third duration, it is determined that the state information is a first state value, wherein the first state value indicates that the shared vehicle is switched from a stopped state to a started state; when the speed of the shared vehicle gradually decreases to 0 and maintains 0 for the preset fourth duration, it is determined that the state information is a third state value, wherein the third state value indicates that the shared vehicle is switched from the riding state to the stopped state; and when the speed of the shared vehicle maintains within a preset speed range, it is determined that the state information is a second state value, wherein the second state value indicates that the shared vehicle is currently in the riding state. In this way, the state of the shared vehicle can be accurately recognized.

In order to implement the above embodiments, the embodiments of the present disclosure further propose an apparatus for controlling power consumption of a shared vehicle.

Figure 6:
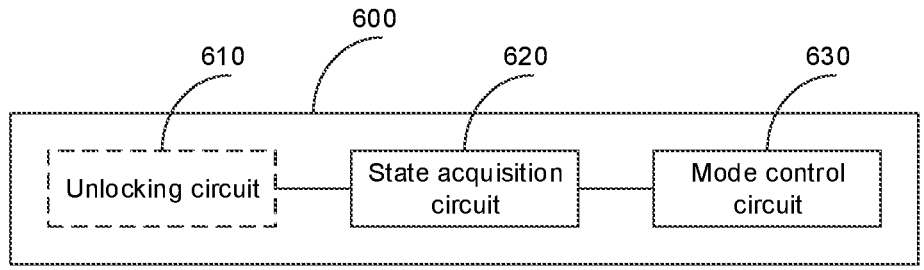
FIG. 6 is a schematic structural diagram of an apparatus for controlling power consumption of a shared vehicle according to an embodiment of the present disclosure.

FIG. 6 is a schematic structural diagram of an apparatus for controlling power consumption of a vehicle according to an embodiment of the present disclosure.

As shown in FIG. 6, the apparatus 600 for controlling power consumption of a vehicle comprises a state acquisition circuit 620 and a mode control circuit 630. In addition, the apparatus 600 for controlling power consumption may further comprise an optional unlocking circuit 610.

The unlocking circuit 610 is configured to receive an unlocking instruction for unlocking the vehicle, and control a lock of the vehicle to be unlocked according to the unlocking instruction.

The state acquisition circuit 620 is configured to determine state information of the vehicle according to driving data of the vehicle.

The mode control circuit 630 is configured to adjust a power consumption mode of an energy consumption circuit in the vehicle according to the state information, wherein the energy consumption circuit consumes different amounts of energy in different power consumption modes.

In some embodiments, the unlocking circuit 610 may be designed as an unlocking circuit based on NFC pairing, an unlocking circuit based on Bluetooth pairing, or an unlocking circuit based on QR code pairing. The unlocking circuit 610 may be configured to unlock the lock through the mechanical structure connected thereto after the unlocking instruction is received and verified.

Figure 7:
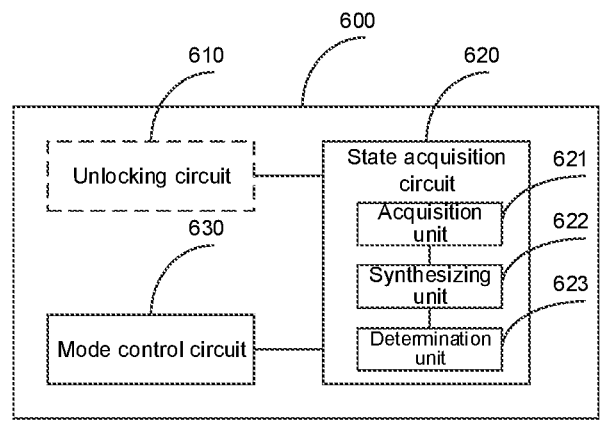
FIG. 7 is a schematic structural diagram of another apparatus for controlling power consumption of a shared vehicle according to an embodiment of the present disclosure.

In some embodiments, as shown in FIG. 7, the state acquisition circuit 620 may comprise: an acquisition unit 621 configured to acquire the driving data of the vehicle through a motion sensor on the vehicle, wherein the driving data at least comprises an acceleration of the vehicle; a synthesizing unit 622 configured to extract acceleration components in an X direction and a Y direction from acceleration data from the motion sensor, and synthesize the acceleration components into an acceleration; and a determination unit 623 configured determine the state information of the vehicle by tracking and analyzing the acceleration.

In some embodiments of the present disclosure, the determination unit 623 is specifically configured to form a variation curve of the tracked acceleration according to the acceleration; judge whether the variation curve indicates that the acceleration increases from 0 to more than a preset first threshold and maintains the preset first threshold for a preset first duration, and if the variation curve indicates that the acceleration increases from 0 to more than a preset first threshold and maintains the preset first threshold for a preset first duration, determine that the state information is a first state value, wherein the first state value indicates that the vehicle is switched from a stopped state to a started state; or acquire variation trajectories of the acceleration in adjacent riding periods from the variation curve; wherein the riding periods are processes in which a power source starts applying force to the vehicle to gradually accelerate the vehicle until the power source stops applying force, and the vehicle continues to move forward due to the previously applied force until it is required to apply force to the vehicle again, analyze whether there is the same stepping cycle or similar stepping cycles between the variation trajectories of the adjacent riding periods, and if there is the same stepping cycle or similar stepping cycles, determine that the state information is a second state value, wherein the second state value indicates that the vehicle is currently in a riding state; or judge whether the variation curve indicates that the acceleration increases from a negative value to 0 and maintains 0 for a preset second duration, and if the variation curve indicates that the acceleration increases from a negative value to 0 and maintains 0 for a preset second duration, determine that the state information is a third state value, wherein the third state value indicates that the vehicle is switched from the riding state to the stopped state.

In some embodiments of the present disclosure, the determination unit 623 is specifically configured to calculate a speed of the vehicle according to the tracked acceleration; judge whether the speed of the vehicle gradually increases from 0 to more than a preset second threshold and maintains the preset second threshold for a preset third duration, and if the speed gradually increases from 0 to more than a preset second threshold and maintains the preset second threshold for a preset third duration, determine that the state information is a first state value, wherein the first state value indicates that the vehicle is switched from a stopped state to a started state; or judge whether the speed of the vehicle maintains within a preset speed range, and if the speed maintains within a preset speed range, determine that the state information is a second state value, wherein the second state value indicates that the vehicle is currently in a riding state; or judge whether the speed of the vehicle gradually decreases to 0 and maintains 0 for a preset fourth duration, and if the speed gradually decreases to 0 and maintains 0 for the preset fourth duration, determine that the state information is a third state value, wherein the third state value indicates that the vehicle is switched from the riding state to the stopped state.

Optionally, the mode control circuit 630 is specifically configured to control the energy consumption circuit in the vehicle to switch from an energy-saving power consumption mode to a full power consumption mode when the state information indicates that the vehicle is switched from a stopped state to a started state; control the energy consumption circuit in the vehicle to switch from the full power consumption mode to the energy-saving power consumption mode when the state information indicates that the vehicle is currently in a riding state; control the energy consumption circuit in the vehicle to switch from the energy-saving power consumption mode to the full power consumption mode when the state information indicates that the vehicle is switched from the riding state to the stopped state; and control the energy consumption circuit in the vehicle to switch from the full power consumption mode to the energy-saving power consumption mode again after the full power consumption mode is maintained for a preset fifth duration.

Optionally, the mode control circuit 630 is further configured to exchange information with a server or the cloud when the energy consumption circuit is in the full power consumption mode.

In the embodiments of the present disclosure, the unlocking circuit 610, the state acquisition circuit 620, and the mode control circuit 630 may be integrated into the same processor or distributed across different processors. The processors may be designed to be a processor having a general logic operation function, for example, a central processing unit (CPU), a field programmable gate array (FPGA), or the like; or a processor designed to perform specific logic operation functions, for example, a single chip microcontroller (MCU), an application specific integrated circuit (ASIC), or the like.

It should be illustrated that the explanation of the embodiments of the method for controlling power consumption of a vehicle in the above embodiments shown in FIGS. 1 to 5 also applies to the apparatus 600 for controlling power consumption of a vehicle according to the present embodiment, and is not described here again.

In the apparatus for controlling power consumption of a vehicle according to the present embodiment, an unlocking instruction for unlocking the shared vehicle is received, a lock of the vehicle is controlled to be unlocked according to the unlocking instruction, driving data of the shared vehicle is collected, state information of the shared vehicle is acquired according to the driving data, and an energy consumption circuit in the shared vehicle is controlled to adjust a power consumption mode thereof according to the state information, wherein the energy consumption circuit consumes different amounts of energy in different power consumption modes. In this way, the energy consumption circuit in the shared vehicle can be enabled to adjust the power consumption mode thereof according to different state information, thereby reducing the power consumption of the shared vehicle and increasing the service life of the battery under limited power.

In order to implement the above embodiments, the embodiments of the present disclosure further propose a vehicle.

Figure 8:
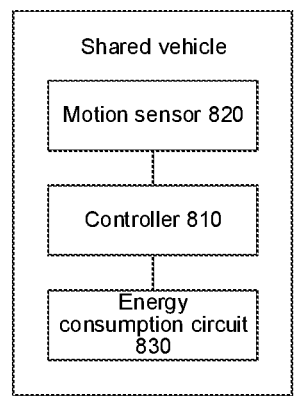
FIG. 8 is a schematic structural diagram of a shared vehicle according to an embodiment of the present disclosure.

FIG. 8 is a schematic structural diagram of a vehicle according to an embodiment of the present disclosure.

As shown in FIG. 8, the vehicle comprises a controller 810, a motion sensor 820 coupled to the controller 810, and an energy consumption circuit 830.

The controller 810 is configured to receive driving data of the vehicle from the motion sensor; determine state information of the vehicle according to the driving data; and adjust a power consumption mode of the energy consumption circuit in the vehicle according to the state information, wherein the energy consumption circuit consumes different amounts of energy in different power consumption modes.

In the embodiments of the present disclosure, the controller 810 may comprise one or more processors which may be designed to be processors having a general logic operation function, for example, central processing units (CPUs), field programmable gate arrays (FPGAs), or the like; or processors designed to perform specific logic operation functions, for example, single chip microcontrollers (MCUs), application specific integrated circuits (ASICs), or the like.

In the embodiments of the present disclosure, the coupling may enable the communication of data, information, instructions, etc. in a wired or wireless manner, for example, by a wireless network, a wired network, and/or any combination of a wireless network and a wired network. The network may comprise a local area network, the Internet, a telecommunication network, the Internet of Things based on the Internet and/or telecommunication network, and/or any combination thereof. The wired network may communicate by using a twisted pair, a coaxial line, or an optical fiber, etc. The wireless network may communicate by using a 3G/4G/5G mobile communication network, Bluetooth, Zigbee, or Wi-Fi, etc.

For example, the controller 810 is configured to determine the state information of the shared vehicle by tracking and analyzing acceleration.

In some embodiments of the present disclosure, the controller 810 is configured to form a variation curve of the tracked acceleration according to the acceleration; judge whether the variation curve indicates that the acceleration increases from 0 to more than a preset first threshold and maintains the preset first threshold for a preset first duration, and if the variation curve indicates that the acceleration increases from 0 to more than a preset first threshold and maintains the preset first threshold for the preset first duration, determine that the state information is a first state value, wherein the first state value indicates that the vehicle is switched from a stopped state to a started state; or acquire variation trajectories of the acceleration in adjacent riding periods from the variation curve; wherein the riding periods are processes in which a power source starts applying force to the vehicle to gradually accelerate the vehicle until the power source stops applying force, and the vehicle continues to move forward due to the previously applied force until it is required to apply force to the vehicle again, analyze whether there is the same stepping cycle or similar stepping cycles between the variation trajectories of the adjacent riding periods, and if there is the same stepping cycle or similar stepping cycles, determine that the state information is a second state value, wherein the second state value indicates that the vehicle is currently in a riding state; or judge whether the variation curve indicates that the acceleration increases from a negative value to 0 and maintains 0 for a preset second duration, and if the variation curve indicates that the acceleration increases from a negative value to 0 and maintains 0 for the preset second duration, determine that the state information is a third state value, wherein the third state value indicates that the vehicle is switched from the riding state to the stopped state.

In some embodiments of the present disclosure, the controller 810 is configured to calculate a speed of the vehicle according to the tracked acceleration; judge whether the speed of the vehicle gradually increases from 0 to more than a preset second threshold and maintains the preset second threshold for a preset third duration, and if the speed gradually increases from 0 to more than a preset second threshold and maintains the preset second threshold for the preset third duration, determine that the state information is a first state value, wherein the first state value indicates that the vehicle is switched from a stopped state to a started state; or judge whether the speed of the vehicle maintains within a preset speed range, and if the speed maintains within a preset speed range, determine that the state information is a second state value, wherein the second state value indicates that the vehicle is currently in a riding state; or judge whether the speed of the vehicle gradually decreases to 0 and maintains 0 for a preset fourth duration, and if the speed gradually decreases to 0 and maintains 0 for the preset fourth duration, determine that the state information is a third state value, wherein the third state value indicates that the vehicle is switched from the riding state to the stopped state.

For example, the controller 810 is configured to control the energy consumption circuit in the vehicle to switch from an energy-saving power consumption mode to a full power consumption mode when the state information indicates that the vehicle is switched from a stopped state to a started state; control the energy consumption circuit in the vehicle to switch from the full power consumption mode to the energy-saving power consumption mode when the state information indicates that the vehicle is currently in a riding state; control the energy consumption circuit in the vehicle to switch from the energy-saving power consumption mode to the full power consumption mode when the state information indicates that the vehicle is switched from the riding state to the stopped state; and control the energy consumption circuit in the vehicle to switch from the full power consumption mode to the energy-saving power consumption mode again after the full power consumption mode is maintained for a preset fifth duration.

The motion sensor 820 is configured to collect the driving data of the vehicle.

The energy consumption circuit 830 is configured to receive a control instruction for switching the power consumption mode from the controller, and switch a current power consumption mode according to the control instruction.

It should be illustrated that the explanation of the embodiments of the method for controlling power consumption of a vehicle in the above embodiments shown in FIGS. 1 to 5 also applies to the vehicle according to the present embodiment, and is not described here again.

Figure 9:
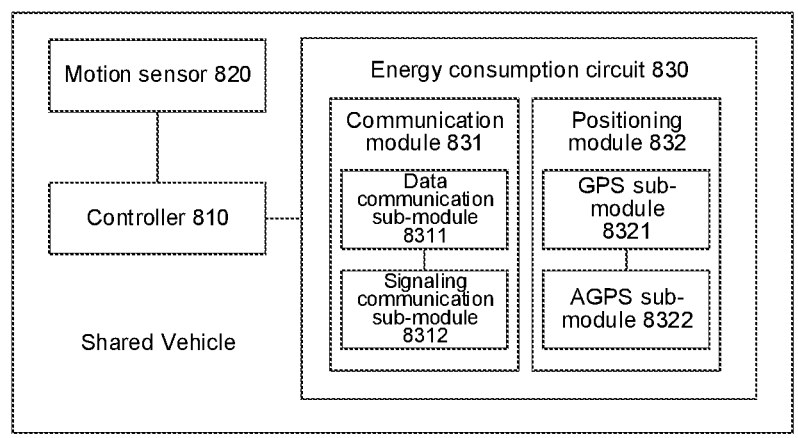
FIG. 9 is a schematic structural diagram of another shared vehicle according to an embodiment of the present disclosure.

In some embodiments of the present disclosure, as shown in FIG. 9, the energy consumption circuit 830 comprises a communication module 831 and a positioning module 832.

The communication module 831 comprises a data communication sub-module 8311 and a signaling communication sub-module 8312.

The data communication sub-module 8311 is in an operating state in the full power consumption mode, and the signaling communication sub-module 8312 is in an operating state in the energy-saving power consumption mode.

In the embodiment of the present disclosure, the data communication sub-module 8311 may realize communication using communication technologies such as General Packet Radio Service (GPRS), 3G, 4G, etc. The signaling communication sub-module 8312 may realize communication using short messages and/or push messages etc.

For example, a link for communication is established between the data communication sub-module 8311 and a server or the cloud. The link may be divided into a long link and a short link. The long link refers to that a link is maintained after two parties of the communication complete data transmission this time, and the two parties may directly transmit data using the link the next time without re-establishing the link. The short link refers to that a link is established each time there is data exchange between two parties of communication, the link is disconnected after the completion of data transmission this time, and when there is data exchange the next time, the link is re-established for data exchange. Preferably, in the present embodiment, the link between the data communication sub-module 8311 and the server or the cloud is a long link, which enables the data communication sub-module 8311 to exchange information with the server or the cloud for a long time.

For example, after the long link is maintained between the data communication sub-module 8311 and the server or the cloud, the data communication sub-module 8311 may be in an operating state only in the full power consumption mode, which can improve the real-time performance of information exchange.

As the signaling communication sub-module 8312 may transmit an instruction at a high frequency using a short byte, considering that the server or the cloud needs to perform operations such as data statistic, self-check, state maintenance, etc. on a shared vehicle at night, the signaling communication sub-module 8312 may be in an operating state only in the energy-saving power consumption mode, which can reduce the power consumption of the shared vehicle, thereby increasing the service life of the battery under limited power.

In order to accurately judge position information of the shared vehicle, the positioning module 832 in the embodiments of the present disclosure comprises: a GPS sub-module 8321 and an Assisted Global Positioning System (AGPS) sub-module 8322, wherein the GPS sub-module 8321 drives both a GPS mode and an AGPS mode of the positioning module 831 to operate simultaneously; and the AGPS sub-module 8322 drives the AGPS mode (it may also be implemented as a GPSone operation mode on a CDMA platform) of the positioning module 831 to operate.

The GPS sub-module 8321 is in an operating state in the full power consumption mode, and is in a turn-off state or intermittently in an operating state in the energy-saving power consumption mode.

In some embodiments, in order to perform rapid positioning, in the full power consumption mode, the GPS sub-module 8321 may be in an operating state, and in the energy-saving power consumption mode, both the GPS sub-module 8321 and the APGS sub-module 8322 may be in a turn-off state, for example, when the shared vehicle is in the stopped state, or both the GPS sub-module 8321 and the APGS sub-module 8322 may be enabled to be intermittently in an operating state or only the AGPS sub-module 8322 is enabled to be in an operating state, for example, when the shared vehicle is in the riding state, so as to save the power consumption of the shared vehicle.

Optionally, when the positioning module 832 is in the energy-saving power consumption mode, in order to make a user know a riding route, a terminal device of the user may also be used to provide positioning information and track information, and transmit the positioning information and the track information to the server or the cloud.

The terminal device may be a smart phone, a tablet computer, etc.

Optionally, the energy consumption circuit 830 is further configured to exchange information with the server or the cloud when the energy consumption circuit 830 in the full power consumption mode.

In the shared vehicle according to the present embodiment, an unlocking instruction for unlocking the shared vehicle is received, a lock of the vehicle is controlled to be unlocked according to the unlocking instruction, driving data of the shared vehicle is collected, state information of the shared vehicle is acquired according to the driving data, and an energy consumption circuit in the shared vehicle is controlled to adjust a power consumption mode thereof according to the state information, wherein the energy consumption circuit consumes different amounts of energy in different power consumption modes. In this way, the energy consumption circuit in the shared vehicle can be enabled to adjust the power consumption mode thereof according to different state information, thereby reducing the power consumption of the shared vehicle and increasing the service life of the battery under limited power.

In the description of the present specification, the description referring to the terms "one embodiment", "some embodiments", "an example", "a specific example", or "some examples" etc. means that a specific feature, structure, material or characteristics described in conjunction with the embodiment or example is included in at least one embodiment or example of the present disclosure. In the present specification, schematic expressions of the above terms do not necessarily have to refer to the same embodiment or example. Furthermore, the specific feature, structure, material, or characteristics described may be combined in any suitable manner in any one or more embodiments or examples. In addition, those skilled in the art can combine and merge different embodiments or examples described in the present specification and features in different embodiments or examples without conflicting with each other.

Furthermore, the terms "first" and "second" are used for descriptive purposes only, and are not to be construed as indicating or implying relative importance or implicitly indicating a number of indicated technical features. Thus, features defined by "first" and "second" may explicitly or implicitly indicate that least one of the features is included. In the description of the present disclosure, "plurality" means at least two, such as two, three, etc., unless explicitly and specifically defined otherwise.

Any process or method described in the flowcharts or described elsewhere herein may be construed as meaning modules, sections, or portions including codes of executable instructions of one or more steps for implementing a custom logic function or process. Further, the scope of the preferred implementations of the present disclosure includes additional implementations in which functions may be performed in a substantially simultaneous manner or in a reverse order, depending on the functions involved, instead of the order shown or discussed, which should be understood by those skilled in the art to which the embodiments of the present disclosure pertain.

A logic and/or steps represented in the flowcharts or otherwise described herein, for example, may be considered as a sequence listing of executable instructions for implementing logical functions, and may be embodied in any computer-readable medium for use by an instruction execution system, apparatus or device (for example, a computer-based system, a system including a processor or other systems which may obtain instructions from the instruction execution system, apparatus or device and may execute the instructions), or may be used in combination with the instruction execution system, apparatus or device. As for this specification, a "computer-readable medium" may be any means which may contain, store, communicate, propagate, or transmit programs for use by or in connection with the instruction execution system, apparatus, or device. More specific examples (non-exhaustive listings) of the computer-readable media include an electrical connection part (an electronic apparatus) having one or more wirings, a portable computer disk cartridge (a magnetic apparatus), a Random Access Memory (RAM), a Read Only Memory (ROM), an Erasable and Programmable Read Only Memory (an EPROM) or a flash memory, a fiber optic apparatus, and a portable Compact Disc-Read Only Memory (CD-ROM). In addition, the computer-readable media may even be paper or other suitable medium on which the programs may be printed, as the programs may be obtained electronically by optically scanning the paper or the other medium and then editing, interpreting, or performing other suitable processing (if necessary) on the paper or the other medium, and then the programs are stored in a computer memory.

It should be understood that portions of the present disclosure may be implemented in hardware, software, firmware, or a combination thereof. In the above embodiments, a plurality of steps or methods may be implemented using software or firmware stored in a memory and executed by a suitable instruction execution system. For example, if implemented in hardware, as in another embodiment, it can be implemented using any one or a combination of the following techniques known in the art: discrete logic gates having logic gate circuits for implementing logic functions on data signals, an application-specific integrated circuit having a suitable combinational logic gate circuit, a Central Processing Unit (CPU), a Programmable Gate Array (PGA), a Field Programmable Gate Array (FPGA), etc.

It can be understood by those of ordinary skill in the art that all or a part of steps carried in the method according to the embodiments may be completed by programs instructing a related hardware. The programs may be stored in a computer-readable storage medium. When executed, the programs include one or a combination of the steps of the method embodiments.

In addition, various functional units in various embodiments of the present disclosure may be integrated in one processing module, or various functional circuits may exist alone physically, or two or more circuits may be integrated in one module. The integrated module may be implemented in a form of hardware or in a form of a software functional module. The integrated module may also be stored in a computer readable storage medium if it is implemented in a form of a software functional module and sold or used as an independent product.

The above-mentioned storage medium may be a read-only memory, a magnetic disk or an optical disk, etc. Although the embodiments of the present disclosure have been shown and described above, it can be understood that the above embodiments are exemplary and are not to be construed as limiting the present disclosure, and those of ordinary skill in the art can make changes, modifications, substitutions and variations to the above embodiments within the scope of the present disclosure.

I claim:

1. A method for controlling power consumption of a vehicle, the method comprising: determining state information of the vehicle according to driving data of the vehicle; and adjusting a power consumption mode of an energy consumption circuit in the vehicle according to the state information, wherein the energy consumption circuit consumes different amounts of energy in different power consumption modes, wherein the driving data is acquired by a motion sensor on the vehicle, and the driving data at least comprises an acceleration of the vehicle, wherein determining state information of the vehicle according to driving data of the vehicle comprises: determining the state information of the vehicle by tracking and analyzing the acceleration, wherein determining the state information of the vehicle by tracking and analyzing the acceleration comprises: forming a variation curve of the acceleration according to the tracked acceleration; judging whether the variation curve indicates that the acceleration increases from 0 to more than a preset first threshold and maintains the preset first threshold for a preset first duration, and in response to the variation curve indicating that the acceleration increases from 0 to more than the preset first threshold and maintaining the preset first threshold for the preset first duration, determining that the state information is a first state value, wherein the first state value indicates that the vehicle is switched from a stopped state to a started state; or acquiring variation trajectories of acceleration in adjacent riding periods from the variation curve; wherein the riding periods are processes in which a power source starts applying force to the vehicle to gradually accelerate the vehicle until the power source stops applying force, and the vehicle continues to move forward due to the previously applied force until it is required to apply force to the vehicle again, analyzing whether there is the same stepping cycle or similar stepping cycles between the variation trajectories of the adjacent riding periods, and in response to there being the same stepping cycle or similar stepping cycles, determining that the state information is a second state value, wherein the second state value indicates that the vehicle is currently in a riding state; or judging whether the variation curve indicates that the acceleration increases from a negative value to 0 and maintains 0 for a preset second duration, and in response to the variation curve indicating that the acceleration increases from a negative value to 0 and maintaining 0 for the preset second duration, determining that the state information is a third state value, wherein the third state value indicates that the vehicle is switched from the riding state to the stopped state,
   wherein adjusting the power consumption mode of the energy consumption circuit in the vehicle according to the state information comprises at least one of:
   when the state information indicates that the vehicle is switched from a stopped state to a started state, controlling the energy consumption circuit in the vehicle to switch from an energy-saving power consumption mode to a full power consumption mode; and
   when the state information indicates that the vehicle is currently in a riding state, controlling the energy consumption circuit in the vehicle to switch from the full power consumption mode to the energy-saving power consumption mode; and
   when the state information indicates that the vehicle is switched from the riding state to the stopped state, controlling the energy consumption circuit in the vehicle to switch from the energy-saving power consumption mode to the full power consumption mode; and after the full power consumption mode is maintained for a preset fifth duration, controlling the energy consumption circuit in the vehicle to switch from the full power consumption mode to the energy-saving power consumption mode again.

2. The method according to claim 1, wherein determining the state information of the vehicle by tracking and analyzing the acceleration comprises:
   calculating a speed of the vehicle according to the tracked acceleration;
   judging whether the speed of the vehicle gradually increases from 0 to more than a preset second threshold and maintains the preset second threshold for a preset third duration, and in response to the speed gradually increasing from 0 to more than the preset second threshold and maintaining the preset second threshold for the preset third duration, determining that the state information is a first state value, wherein the first state value indicates that the vehicle is switched from a stopped state to a started state; or
   judging whether the speed of the vehicle maintains within a preset speed range, and in response to the speed maintaining within the preset speed range, determining that the state information is a second state value, wherein the second state value indicates that the vehicle is currently in a riding state; or
   judging whether the speed of the vehicle gradually decreases to 0 and maintains 0 for a preset fourth duration, and in response to the speed gradually decreasing to 0 and maintaining 0 for the preset fourth duration, determining that the state information is a third state value, wherein the third state value indicates that the vehicle is switched from the riding state to the stopped state.

3. The method according to claim 1, wherein when the energy consumption circuit is in the full power consumption mode, information is exchanged with a server or a cloud.

4. The method according to claim 1, further comprising:
   extracting acceleration components in an X direction and a Y direction from acceleration data from the motion sensor, and synthesizing the acceleration components into the acceleration.

5. An apparatus for controlling power consumption of a vehicle, the apparatus comprising: a controller; a memory having instructions stored thereon, which when executed by the controller, cause the controller to: determine state information of the vehicle according to driving data of the vehicle; and adjust a power consumption mode of an energy consumption circuit in the vehicle according to the state information, wherein the energy consumption circuit consumes different amounts of energy in different power consumption modes, wherein the driving data is acquired by a motion sensor on the vehicle, and the driving data at least comprises an acceleration of the vehicle, wherein the instructions, when executed by the controller, cause the controller further to determine the state information of the vehicle by tracking and analyzing the acceleration, wherein the instructions, when executed by the controller, cause the controller further to: form a variation curve of the acceleration according to the tracked acceleration; judge whether the variation curve indicates that the acceleration increases from 0 to more than a preset first threshold and maintains the preset first threshold for a preset first duration, and in response to the variation curve indicating that the acceleration increases from 0 to more than the preset first threshold and maintaining the preset first threshold for the preset first duration, determine that the state information is a first state value, wherein the first state value indicates that the vehicle is switched from a stopped state to a started state; or acquire variation trajectories of acceleration in adjacent riding periods from the variation curve; wherein the riding periods are processes in which a power source starts applying force to the vehicle to gradually accelerate the vehicle until the power source stops applying force, and the vehicle continues to move forward due to the previously applied force until it is required to apply force to the vehicle again, analyze whether there is the same stepping cycle or similar stepping cycles between the variation trajectories of the adjacent riding periods, and in response to there being the same stepping cycle or similar stepping cycles, determine that the state information is a second state value, wherein the second state value indicates that the vehicle is currently in a riding state; or judge whether the variation curve indicates that the acceleration increases from a negative value to 0 and maintains 0 for a preset second duration, and in response to the variation curve indicating that the acceleration increases from a negative value to 0 and maintaining 0 for the preset second duration, determine that the state information is a third state value, wherein the third state value indicates that the vehicle is switched from the riding state to the stopped state,
   wherein the instructions, when executed by the controller, cause the controller further to operate as at least one of:
   when the state information indicates that the vehicle is switched from a stopped state to a started state, control the energy consumption circuit in the vehicle to switch from an energy-saving power consumption mode to a full power consumption mode; and
   when the state information indicates that the vehicle is currently in a riding state, control the energy consumption circuit in the vehicle to switch from the full power consumption mode to the energy-saving power consumption mode; and
   when the state information indicates that the vehicle is switched from the riding state to the stopped state, control the energy consumption circuit in the vehicle to switch from the energy-saving power consumption mode to the full power consumption mode; and after the full power consumption mode is maintained for a preset fifth duration, control the energy consumption circuit in the vehicle to switch from the full power consumption mode to the energy-saving power consumption mode again.

6. A vehicle, comprising: a controller, a motion sensor, and an energy consumption circuit, wherein the controller is configured to receive driving data of the vehicle from the motion sensor, determine state information of the vehicle according to the driving data; and adjust a power consumption mode of the energy consumption circuit in the vehicle according to the state information, wherein the energy consumption circuit consumes different amounts of energy in different power consumption modes, wherein the motion sensor is configured to collect the driving data of the vehicle; and wherein the energy consumption circuit is configured to receive a control instruction for switching the power consumption mode from the controller, and switch a current power consumption mode according to the control instruction, wherein the driving data is acquired by a motion sensor on the vehicle, and the driving data at least comprises an acceleration of the vehicle, wherein the controller is further configured to determine the state information of the vehicle by tracking and analyzing the acceleration, wherein the controller is further configured to: form a variation curve of the acceleration according to the tracked acceleration; judge whether the variation curve indicates that the acceleration increases from 0 to more than a preset first threshold and maintains the preset first threshold for a preset first duration, and in response to the variation curve indicating that the acceleration increases from 0 to more than the preset first threshold and maintaining the preset first threshold for the preset first duration, determine that the state information is a first state value, wherein the first state value indicates that the vehicle is switched from a stopped state to a started state; or acquire variation trajectories of acceleration in adjacent riding periods from the variation curve; wherein the riding periods are processes in which a power source starts applying force to the vehicle to gradually accelerate the vehicle until the power source stops applying force, and the vehicle continues to move forward due to the previously applied force until it is required to apply force to the vehicle again, analyze whether there is the same stepping cycle or similar stepping cycles between the variation trajectories of the adjacent riding periods, and in response to there being the same stepping cycle or similar stepping cycles, determine that the state information is a second state value, wherein the second state value indicates that the vehicle is currently in a riding state; or judge whether the variation curve indicates that the acceleration increases from a negative value to 0 and maintains 0 for a preset second duration, and in response to the variation curve indicating that the acceleration increases from a negative value to 0 and maintaining 0 for the preset second duration, determine that the state information is a third state value, wherein the third state value indicates that the vehicle is switched from the riding state to the stopped state, wherein the controller is further configured to operate as at least one of:

when the state information indicates that the vehicle is switched from a stopped state to a started state, control the energy consumption circuit in the vehicle to switch from an energy-saving power consumption mode to a full power consumption mode; and when the state information indicates that the vehicle is currently in a riding state, control the energy consumption circuit in the vehicle to switch from the full power consumption mode to the energy-saving power consumption mode; and when the state information indicates that the vehicle is switched from the riding state to the stopped state, control the energy consumption circuit in the vehicle to switch from the energy-saving power consumption mode to the full power consumption mode; and after the full power consumption mode is maintained for a preset fifth duration, control the energy consumption circuit in the vehicle to switch from the full power consumption mode to the energy-saving power consumption mode again.

* * * * *